Oct. 19, 1954
A. A. HEYMAN
2,691,947
DEVICE FOR MAINTAINING ALIGNMENT BETWEEN
MOLDS AND COOPERATING ROTATING CORES
Filed Dec. 28, 1953
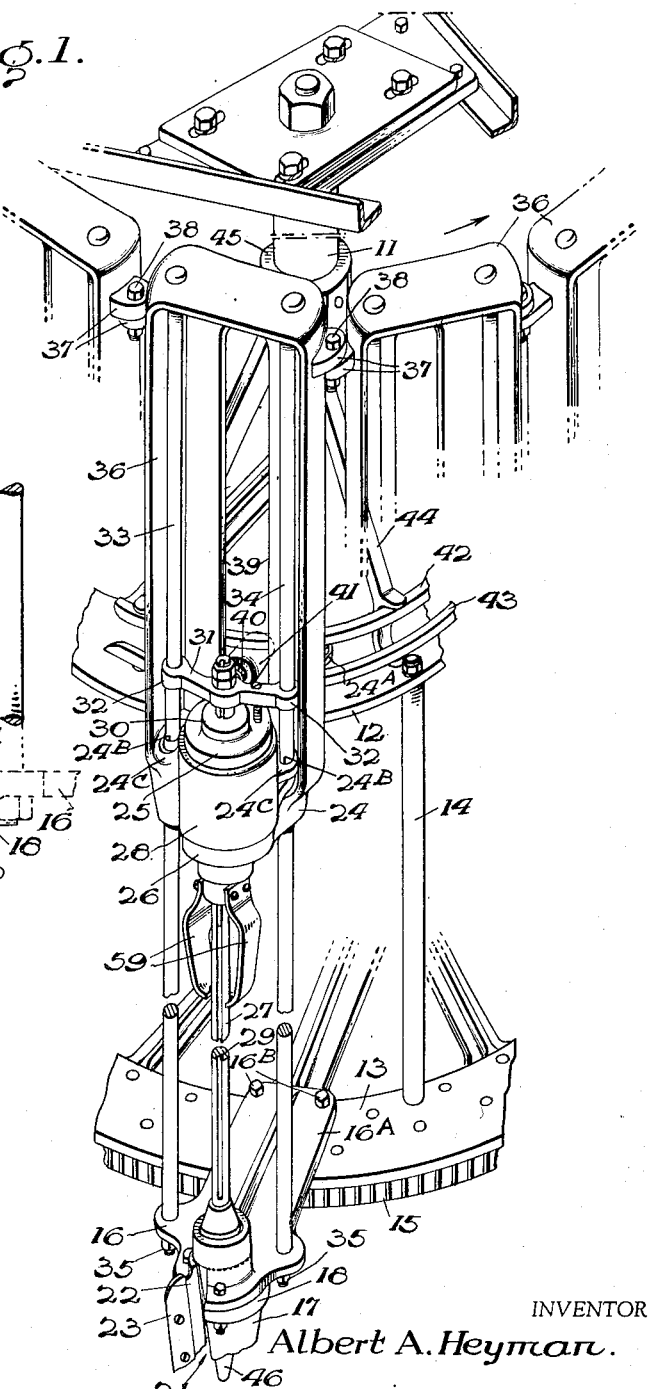
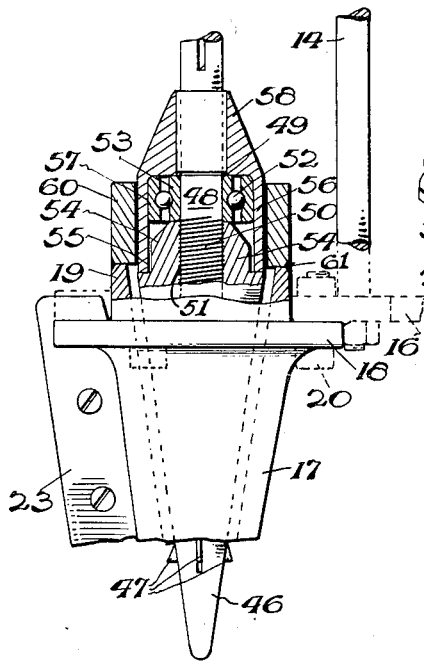
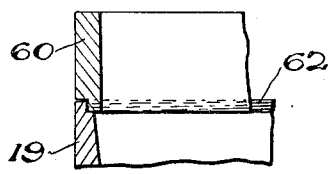
INVENTOR
Albert A. Heyman.
BY Albert J. Kramer
ATTORNEY Patented Oct. 19, 1954

2,691,947

UNITED STATES PATENT OFFICE 2,691,947

DEVICE FOR MAINTAINING ALIGNMENT BETWEEN MOLDS AND COOPERATING ROTATING CORES

Albert A. Heyman, Baltimore, Md., assignor to The Maryland Baking Company, Baltimore, Md., a corporation of Maryland Application December 28, 1953, Serial No. 400,603

5 Claims. (Cl. 107—58)

This is a continuation-in-part of my copending application, Serial No. 268,293, filed January 25, 1952, now Patent No. 2,669,196, dated February 16, 1954.

This invention relates to machines for automatically making rolled hollow cones and is more particularly concerned with devices for improving the operation of such machines of the type described in the copending application of James Balton for patent, Serial No. 261,274, filed December 12, 1951.

The machine referred to comprises, generally, a chain of waffle irons for baking wafers to be rolled into edible ice cream cones and a turret unit for removing baked wafers from said irons and rolling them into cones. The turret comprises a ring of conical molds disposed around the periphery of the turret, each mold having a slotted inlet for the passage to the interior thereof of baked wafers from the waffle irons. Each inlet has a scraper blade attached to it to contact the waffle irons and direct them into the inlet. The turret also carries a ring of correspondingly spaced conical cores or spinners, one for each mold. Each spinner is carried at the bottom of a vertical reciprocating shaft. Each shaft is carried on a roller which is rotatably carried at a fixed position on the turret above the mold. The shaft rotates with the roller and reciprocates relative thereto, whereby rotation of the roller causes the spinner to rotate and permits it to move in and out of the mold.

The rotation of each roller is effected at intervals while its corresponding spinner is disposed within the mold for the purpose of forming the cone. In order to effect this result properly, it is necessary that the axis of the spinner and the axis of the mold be held in substantial alignment. Otherwise, the pressure exerted against the spinner by the wafer entering the mold forces the spinner to an eccentric position with the result that the cone is not properly formed. Also, such eccentricity sometimes results in a failure of the spinner to grip the wafer and spin it around in the mold at the proper time, resulting in inefficiency, poor timing, and the formation of imperfect cones which must be rejected and discarded as an unsaleable item.

Accordingly, one of the objects of this invention is the provision of a device in combination with a machine of the type mentioned which will maintain substantial alignment of the axes of the mold and its spinner, particularly during the time when the spinner is turning inside the mold and cooperating therewith to form the cone from the wafer inserted therein.

Another object of the invention is the provision of such a device which is simple to attach to the machine and does not interfere with the other functions of the machine.

A further object is such a device which can form a permanent part of the machine, but which can, at the same time, be readily detached therefrom for repairs or replacement, if needed.

A still further object is the provision of alternative devices for accomplishing such results.

A still further object is the provision, in a machine of the type mentioned, of a cap on the spinner member, the latter being rotatable relative to the cap, and abutment means between the cap and the mold to resist radial displacement of the spinner relative to the mold.

These and other objects and advantages of the invention will appear more fully from the following description, considered together with the accompanying drawing, in which:

Fig. 1 is a fragmentary perspective view of the turret portion of the cone rolling machine showing an embodiment of this invention attached thereto.

Fig. 2 is a side elevational view, partly in section, of the embodiment.

Fig. 3 is a fragmentary view showing an alternative embodiment of the invention.

Referring with more particularity to the drawing, in which like numerals designate like parts, the invention is illustrated with respect to a turret or cone forming unit, which unit comprises an assembly mounted on a vertical stationary shaft 11 upon which are rotatably mounted two horizontal wheels 12 and 13, connected together with tie bars 14. These wheels are adapted to be rotated simultaneously about the shaft 11 by a pinion (not shown) engaging a ring gear 15 on the bottom of the lower wheel 13.

The lower wheel 13 carries at its periphery a plurality of circumferentially spaced horizontal brackets 16 (only one shown), projecting outwardly from the edge of the wheel. These brackets have rearward portions 16A which are connected to the wheel 13 by bolts 16B. To the bottom of each bracket, there is mounted a hollow conical member 17, constituting the mold within which the baked wafers are formed into cones. The mold 17 is provided with an attaching flange 18 near the top. The top 19 of the mold projects upwardly through an aperture in the bracket 16 and the top of the flange 18 bears against the bottom of said bracket 16. Bolts 20 serve to secure the flange of the molds to the bracket.

The molds are each provided with a longitudinal slot 21 to permit entrance therein of the wafer to be formed. The slot extends from the apex of the mold to the top, substantially as shown.

On one side of the slot, there projects a nearly tangential extension 22 which is provided with a removable scraper blade 23 to scoop the wafer into the opening from the waffle irons (not shown) and hence into the interior of the mold where it is shaped into a cone.

The upper wheel is also provided with a plurality of circumferentially spaced brackets 24, each vertically aligned with one of the brackets 16 on the lower wheel. The brackets 24 are each provided with a rearward portion 24A, as in the case of the bracket 16, which is secured to the wheel 12 by bolts (not shown), similar to the manner in which the brackets 16 are secured to the wheel 13. Each bracket 24 has an integral yoke having vertically spaced arms 25 and 26. A vertical shaft 27 is mounted for vertical reciprocation on the arms of said yoke. Between the arms 25 and 26, a roller 28 is disposed and through the axis of said roller the shaft 27 also passes. The shaft is mounted for rotation with the roller 28, but it is axially slidable relative thereto by means of a key (not shown) secured to the roller and slidably engaged with a longitudinal keyway 29 on the face of the shaft.

The upper end of the shaft 27 is journaled in a bearing 30 in the center of a cross arm 31. The outer ends of said cross arm have vertical sleeves 32 which are slidably engaged with vertical guide rods 33 and 34. The lower ends of said rods 33 and 34 pass through vertical bores 24B in lobes 24C of the upper wheel bracket 24 and are secured to the lower wheel bracket 16 by bolts 35, thereby serving to resist torsional misalignment between said upper and lower brackets. The upper ends of the said rods are held in apertures at the upper ends of a vertically elongated portion 36 of the bracket 24. The upper ends of the elongated portions 36 are linked together by means of overlapping lugs 37 connected by bolts 38.

The inner side of the elongated portion 36 is provided with an elongated vertical slot 39 through which a horizontal finger 40, integral with the cross arm 31, extends radially inward and is provided with a cam roller 41. Said cam roller moves along a camway composed of a pair of straddling parallel rails 42 and 43 which extend around approximately one-half of the inside of the cage formed by the bracket portions 36 and contain curvatures to impart vertical movement of the cam rollers 41 and hence the shaft 27 in accordance with the requirements. The camway rails are supported in fixed position by means of radial arms 44 secured to a hub 45 of the stationary shaft 11.

To the lower end of the reciprocating shaft 27, there is secured a conical core or spinner 46, having lateral projections 47. This core or spinner is adapted to move in and out of the mold 17 by virtue of the reciprocation of the shaft 27 and also to be rotated at definite intervals by means (not shown) engaging the rollers 28.

The lower end 48 of the shaft 27 is reduced in diameter to provide a shoulder 49 facing downwardly. Below the shoulder 49 the said lower end is provided with threads 50 which engage threads 51 of a center bore of the spinner. On top of the spinner, a ball bearing assembly 52 is mounted with the inner race 53 about the shaft end 48, substantially as shown. The bearing is held in this position between the top of the spinner and the shoulder 49. The upper end 54 of the spinner is recessed to provide an upwardly facing annular shoulder 55 over which there is disposed a hollow cap 56, the outer diameter of which is substantially flush with the largest diameter of the spinner. The inside diameter of the cap is the same as the outside diameter of the outer race 57 of said bearing and is frictionally engaged therewith by a force fit. Consequently, the spinner may be rotated freely and independently of the cap 56 but will reciprocate with it.

The upper part 58 of the cap is upwardly tapered to engage and spread apart resilient stripping fingers 59 which slide over the cap and thence over the top portion of the spinner to remove the formed cones upon elevation of the shaft 27.

A hollow cylindrical member 60 is mounted on top of the mold 17 and concentric therewith. The inside diameter of the member is substantially the same as the outside diameter of the cylindrical portion of the cap, that is, the lower portion below the part 58. The member 60 may be rigidly secured to the mold by welding 61 as shown in Fig. 2, or it may be removably secured for ease in making repairs and replacements by screw threads 62, as shown in Fig. 3, or it may be secured by any other suitable means. Where screw threads are used, the threads should be placed so that the two parts are engaged by rotating the cap 56 in the same direction as the spinner rotates. Contact with the cap will thus tend to keep it tight, rather than loose.

By these means, as the spinner proceeds downwardly into the mold 17, the member 60 engages the cylindrical surface of the cap 56 and centers the spinner, if it is off center, with respect to the axis of the mold before the spinner engages the wafer. Also, the spinner is maintained in alignment under radial forces acting against the spinner after it engages the wafer and tending to displace it with respect to the mold. The ball bearing arrangement prevents friction developed between the member 60 and the cap 56 from interfering with the normal rotational speed of the spinner.

Having thus described my invention, I claim:

1. In a machine having a hollow mold and a rotatable spinner member adapted to coact with the interior of said mold to form hollow articles, said member being mounted on an axially reciprocable shaft, a cap rotatably mounted on said member and connected to it for movement axially therewith, at least a portion of said cap being cylindrical, and a hollow member surmounting said mold, the inner wall of said hollow member being cylindrical and of a diameter substantially equal to the diameter of the said cylindrical portion of said cap, so as to engage the cap and resist displacement of the spinner member relative to the mold.

2. In a machine having a hollow mold and a rotatable spinner member adapted to coact with the interior of said mold to form hollow articles, said member being mounted on an axially reciprocable shaft, a cap rotatably mounted on said member and connected to it for movement axially therewith, at least a portion of said cap being cylindrical, and a hollow member surmounting said mold, said hollow member being welded to said mold, the inner wall of said hollow member being cylindrical and of a diameter substantially equal to the diameter of the said cylindrical portion of said cap, so as to engage the cap and resist displacement of the spinner member relative to the mold.

3. In a machine having a hollow mold and a rotatable spinner member adapted to coact with the interior of said mold to form hollow articles, said member being mounted on an axially reciprocable shaft, a cap rotatably mounted on said member, at least a portion of said cap being cylindrical, and a hollow member surmounting said mold, said hollow member being removably attached to the mold, the inner wall of said hollow member being cylindrical and of a diameter substantially equal to the diameter of the said cylindrical portion of said cap, so as to engage the cap and resist displacement of the spinner member relative to the mold.

4. The subject matter defined by claim 3 in which the hollow member is removably attached to the mold by screw threads.

5. The subject matter as defined by claim 4 in which the screw threads are arranged so that the hollow member is tightened by rotating it in the same direction as the spinner rotates.

References Cited in the file of this patent

UNITED STATES PATENTS

| Number | Name | Date |
| --- | --- | --- |
| 1,377,304 | Borchard | May 10, 1921 |
| 1,537,993 | Lewison | May 19, 1925 |